United States Patent Office 2,827,785
Patented Mar. 25, 1958

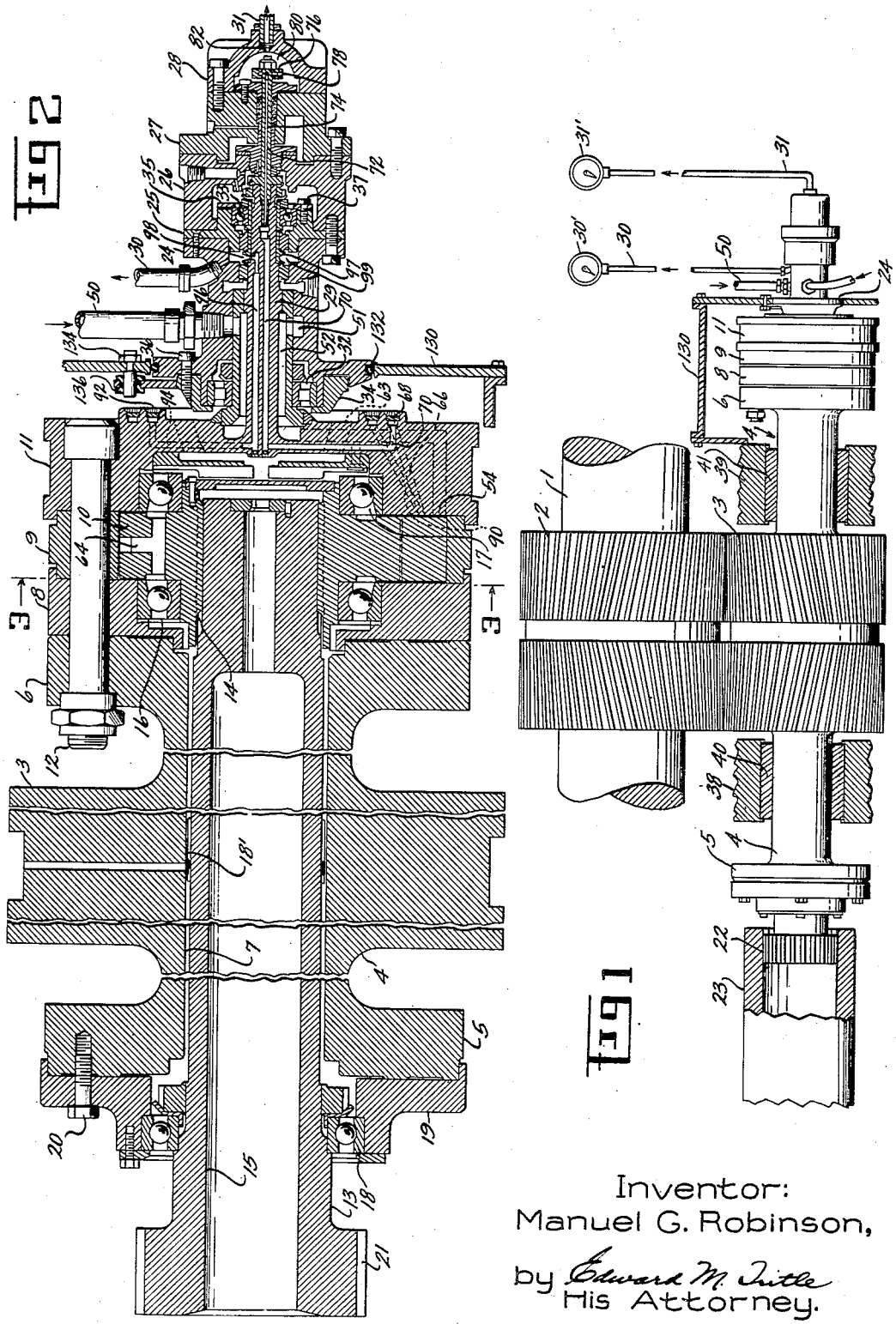

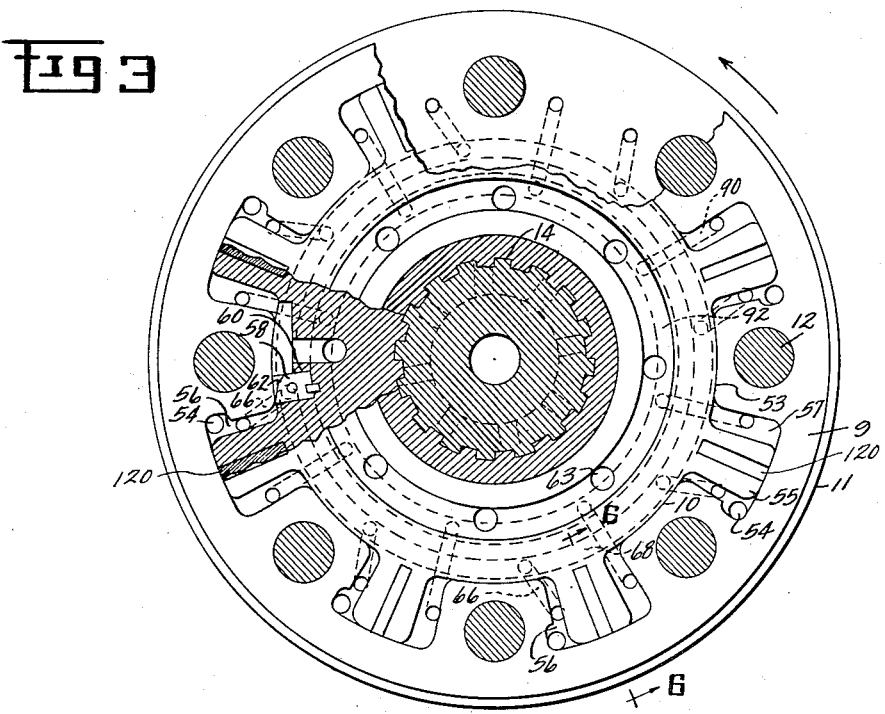
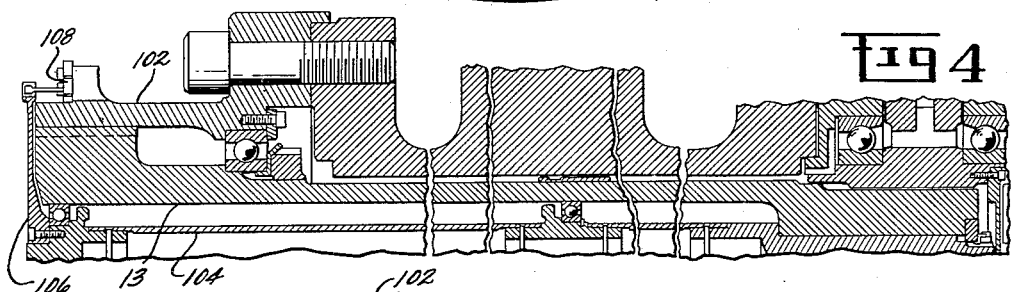
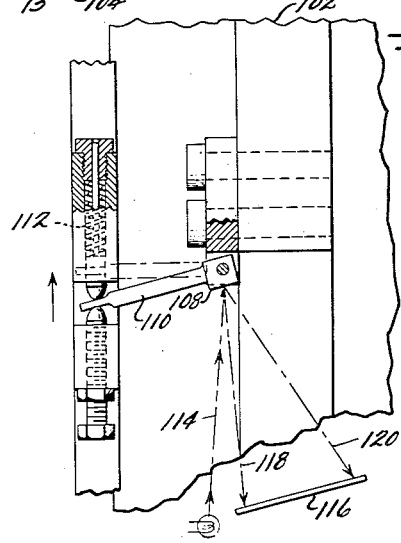
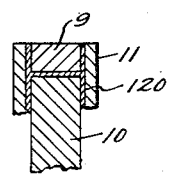
Inventor:
Manuel G. Robinson,
by Edward M. Tritle
His Attorney.

2,827,785

HYDRAULIC TORQUEMETER

Manuel G. Robinson, Marblehead, Mass., assignor to General Electric Company, a corporation of New York Application February 3, 1955, Serial No. 485,875

2 Claims. (Cl. 73—136)

This invention relates to transmission dynamometers for transmitting power hydraulically from a driving to a driven shaft and also for indicating the magnitude of the torque or power being transmitted.

For many years there has been a need for a dynamometer of the type described capable of transmitting and giving a correct indication of relatively large and small amounts of power without any unusual disturbance such as "hunting". Generally speaking, meters as were formerly available were incapable of transmitting such large amounts of power, and were subject to the disadvantage of instability under certain operating conditions, and had relatively narrow operating range. Even more important was the fact that the means and methods for obtaining calibration of the prior art dynamometers was such that calibration was inaccurate and unreliable. Furthermore, during calibration of such prior art dynamometers it was impossible to duplicate operation at speed conditions that may exist during operation of the dynamometer at full speed. Accordingly, accuracy of calibration of the prior art devices was often questionable.

Accordingly, it is an object of the present invention to provide an improved transmission dynamometer in which the above-mentioned difficulties are obviated.

Another object of the invention is in the provision of an improved transmission dynamometer with torque measuring means for improving stability of operation of the device and for increasing the degree of accuracy of torque indication.

In previous torque measuring devices, pressures are measured at the source of supply. It is noted that pressure drops occur between the point of supply and the active surfaces and make calibration practically impossible for all conceivable conditions that might take place. It is, therefore, still another general object of this invention to measure the pressures acting on the significant surfaces.

A further object of the invention is in the provision of an improved arrangement wherein the effects of pumping action due to centrifugal forces arising from rotation of certain elements of the dynamometer, is cancelled or minimized in order to prevent erroneous torque or power indications.

Still another object of this invention is in the provision of an improved structural arrangement whereby all conditions that exist during operation of the device can be duplicated during calibration thus providing improved accuracy and reliability.

It is a still further object of this invention to provide a torque-meter comprising a metering element capable of transmitting both low powers as well as high powers without any unusual disturbances such as "hunting."

Other objects and advantages will become apparent from the following description taken in connection with the accompanying drawings in which;

Figure 1 is a diagrammatic view showing a dynamometer embodying the features of the invention and arranged to transmit and measure the amount of power transmitted from a driving element to a driven element;

Figure 2 is a transverse sectional view of the dynamometer portion of the arrangement shown in Figure 1;

Figure 3 is a fragmentary sectional view taken on line 3—3 of Figure 2 with a portion of this view taken on the center line of the internal spider in order to more clearly show the relationship between the spider teeth and the metering valve, and wherein the teeth are deleted in order to more clearly show the relationship of the various passageways;

Figure 4 shows a portion of the arrangement shown in Figure 2 as modified in order to effect calibration of the device;

Figure 5 is an enlarged view of the mirror arrangement employed for measuring torsional deflection of the power transmitting shaft taken on lines 5—5 of Figure 4;

Figure 6 is a cross-sectional view through the spider teeth showing the bearing material therebetween.

In the following description the torque transmitting fluid will be referred to as oil which in most cases will be found to be most suitable but it is not intended that it should be limited to oil as other liquids can be employed in place thereof.

Referring now to Figures 1–3, a driving shaft element 1 carrying a gear 2 supplies torque or power to pinion 3. As is best shown in Figure 2, pinion 3 is formed integral with a shaft 4 which carries flanges 5 and 6 at either end thereof. It will be understood, however, that pinion 3, and flanges 5 and 6 may be manufactured as separate elements if desired, and suitably secured to shaft 4 by any convenient means such as by keying, splining, pinning, and the like. For reasons that will become apparent as the description proceeds, shaft 4 is provided with a bore 7.

The power indicating portion of the dynamometer comprises annular member 8, annular spider 9, spider 10, and passageway member 11. These four annular members are clamped together and to flange 6 by a plurality of bolts or threaded fasteners 12. Torque supplied from driving shaft element 1 and gear 2 is transmitted from pinion 3 ultimately to spider 10 and finally from spider 10 to a power transmitting or torque shaft 13 by a spline 14.

For calibration reasons, as will become apparent as the description proceeds, torque shaft 13 is provided with a central bore 15. In order to permit relative movement between torque shaft 13 and the pinion 3, hollow shaft 4, and annular members 8, 9, 11, antifriction bearings 16, 17 are carried on spider 10 and within annular member 8 and passageway member 11. Bearing 18 is carried on torque shaft 13 and within flange 19 which is in turn secured to flange 5 by a plurality of bolts 20. There is also provided a "damper bearing" 18' which serves to prevent whipping of the torque shaft 13. Since the view shown in Figure 2 is in broken section it might not be recognized that a whipping problem with respect to the torque shaft might exist. Actually this shaft may be several feet long, and since it must be made sufficiently flexible to obtain measurable amounts of torsional deflection when mechanical power is supplied thereto, such a relatively long and lightly constructed member may bend easily and may whip during high speed operation. Accordingly, the "inside out" bearing arrangement is provided to prevent such whipping. This "damper bearing" 18' is mounted on a land portion on the torque shaft 13. This bearing 18' does not function in the same manner as a normal bearing in that there is no relative rotation between torque shaft 13 and the internal surface bore 7 except for the relatively small torsional deflections of shaft 13 with respect to the bore 7. However, this bearing type construction is employed in order to minimize friction in the device. Torque shaft 13 is provided with a splined end portion 21 which engages an internal splined end portion 22 of driven element 23.

A stationary housing comprising five principal housing elements 24, 25, 26, 27 and 28, surrounds a shaft-like end portion 29 which may be welded to or made integral with rotating annular member 11. It will be understood that the housing need not be made up of a plurality of individual housing members 24—28 but rather could be a housing of a single element. A plurality of housing members is provided primarily to facilitate manufacture and assembly of the dynamometer. Within the various housing members 24—28 are provided various passageways for supplying oil to the rotating elements of the dynamometer and for providing other passageways for placing pressure-sensing conduits 30 and 31 in communication with certain passageways formed between annular spider 9 and spider 10 as will be hereinafter further explained. The shaft-like end portion 29 of annular member 11 is rotatably supported by bearings 32, 33 within housing portions 24 and 25 respectively. Bearing retainer members 34, 35 serve to hold bearings 32, 33 in their proper position and are secured to housing members 24, 25 by threaded fastenings 36, 37 respectively. Pinion 3 is enclosed in a suitable housing, the walls of which are indicated at 38, 39 mounted on shaft 4 through bearings 40 and 41 as shown in Figure 1.

Mounted in housing 24 is a high pressure oil inlet 50. The oil inlet 50 is connected to an annular chamber 51 in housing 24 and thus to an axially and radially extending passageway 52 in annular member 11. This establishes communication between the high pressure oil inlet 50 and high pressure oil supply holes 54 as best shown in Figure 3. The outer annular spider 9 is provided with a plurality of gear teeth 53 formed on its internal surface. Similar mating teeth 55 are provided on the external surface of the inner spider 10. A high pressure oil space or chamber 56 and a low pressure oil space or chamber 57 is formed between the gear teeth of the annular spider 9 and spider 10. An oil metering valve 58 is provided near the high pressure space 56 comprising a block having an outer edge portion curved to match the innermost portion of a tooth on the annular spider 9. The metering valve is held in a desired position by means of a suitable recess 60 provided in the spider 10 as shown in Figure 3. The outermost surface of the block forms a very close clearance with the innermost surface of the teeth of the annular spider 9. The metering valve has a variable depth slot 62 milled therein so as to provide a variable discharge orifice from the high pressure oil space 56. For communication with the variable discharge orifice formed by the metering valve 58 is a discharge passageway 64 located in the spider 10. The oil which is discharged through discharge passageway 64 serves to lubricate the bearings 16 and 17 (Fig. 2). The bore 7 is in communication with the bearing 16 and therefore the lubricating oil from the bearing 16 passes between the shaft 13 and bore 7 to the damper bearing 18'. The oil that passes through bearing 17 from the discharge passageway 64 empties into a sump (partially shown) through an opening 63 in the member 11.

Referring again to Figure 3, connected to the high pressure area 56 is a high pressure passageway 66 in the annular member 11. The passageway 66 establishes communication between the high pressure area 56 and an annular passageway 68 for the high pressure fluid. It is apparent from the drawing in Figure 2 that the annular passageway 68 communicates with radially and axially extending passageway 70 provided in the annular member 11 and axially extending portion 29. Connected to the axially extending portion 29 is a shaft extension 72 provided with an axially extending passageway 74 communicating with the passageway 70. At the end of the shaft extension 72 is provided a runner 76 having a passageway 78 communicating with the passageway 74. The passageway 78 communicates with a chamber 80 in the housing portion 28. As oil passes through the radial hole 78, it is thrown out into chamber 80, and the rotation of the shaft extension creates a pressure which is a function of the diameter of the runner 76. The housing 28 is further provided with a passageway 82 so as to connect the chamber 80 with the high pressure sensing tap or conduit 31 and the high pressure measuring gage 31'.

Connected to the low pressure chamber 57 (Fig. 3) is a low pressure passageway 90 which terminates into an annular passageway 92. The annular passageway 92 communicates with a radially extending passageway 94 in annular member 11 (Fig. 2). The passageway 94 communicates with an axially extending passageway 96 located in the axially extending portion 29 of the annular member 11. A runner member 97 is positioned on the axially extending portion 29 of the annular member 11. This runner member 97 is provided with a passageway 98 so as to communicate with the passageway 96. The passageway 98 discharges into an annular chamber 99 in housing 24 to which is connected the low pressure sensing tap 30 and low pressure sensing gage 30'.

One of the major problems involved in a hydraulic torque meter is keeping the consumption of high pressure oil to a minimum. A considerable amount of oil leakage occurs across the teeth of the spider element 10 under the high pressure differential existing between the high pressure area and the low pressure area since the spider 10 must be free to move and not have frictional forces acting upon it. This permits the correct power indication to be obtained. Since the leakage varies according to the clearance, it is important to keep the clearance to a minimum. At the critical locations, narrow strips of bearing material 120 shown in Figures 3 and 6 are provided on the tooth surfaces so as to have small clearances. It is noted that any additional drag due to rubbing on the bearing material would be very low and would soon disappear due to wear of the soft bearing material but the effect on the leakage flow is very significant. This construction gives the smallest possible clearance and yet does not have very much significant drag.

In the torque meter arrangement, the amount of torsion or the angle of twist of a torque shaft (which is proportional to the torque applied to the shaft) is measured during operation by observing an oil pressure differential across the teeth of the driving and driven spiders. The torque meter assembly is connected between a prime mover or other source of mechanical power and a mechanical load neither of which are shown. Mechanical power or torque from the prime mover is applied to gear or pinion 3 which is of rugged construction and provided with a relatively high moment of inertia so that there will be relatively small angular deflection thereof even when relatively high torque is applied thereto. The torque applied to the gear or pinion 3 is transmitted to the outer annular spider 9 through bolts and clamping rings. The torque is transmitted from the internal teeth 53 of the outer annular spider 9 to the mating external teeth provided on the inner spider 10, through fluid under pressure which is admitted through the high pressure oil supply inlet 50 and the high pressure oil supply hole 54 between the faces of the teeth on the inner and outer spiders. The fluid flows radially inward between the faces of the adjacent teeth, then flows through an oil metering valve 58 and is finally discharged into an oil discharge hole 64. The oil passes from discharge hole 64 and serves to lubricate bearings 16, 17 and 18. Also the oil discharges into a pump sump (not shown) through opening 63 after it passes through the bearing 17. A small portion of the fluid, which is admitted through the high pressure oil supply hole 54, flows through the clearance space between the outer surface of the teeth on the inner spider 10 and the inner surface of the teeth on the outer spider 9, and also passes the clearance space between the side faces of the teeth on inner spider 10. This fluid is also then discharged through the oil discharge hole 64 which again serves to lubricate the bearings 16 and 17 etc. The fluid, which is supplied under pressure at an essentially constant rate of flow from inlet 50 to the high pressure area 56, communicates with high pressure passageway 66, annular passageway 68, passageway 70 in the axially extending portion 29 of the member 11 which, in turn, communicates with the passageway 74 in the shaft extension 72 which, in turn, communicates with the passageway 78 and the runner 76, into a pressure chamber 80 which is in communication with the high pressure sensing tap 31. The low pressure in the low pressure area 57 is transmitted through the low pressure passageway 90 into the annular passageway 92, which communicates with the passageway 96 and 98 to the low pressure sensing tap 30.

The design of the metering valve 58 is such that the flow area increases at a very slow rate with increase in the angle of separation between the driving and the driven teeth. Also, in operation of the meter, high pressure oil is supplied at an essentially constant rate for the selected torque range. It follows that when relatively low torques are being transmitted and, therefore, the oil pressure in space 56 is relatively low, the amount of tooth separation is relatively large to provide the relatively large flow area required. Similarly, under high torque the pressure in space 56 is relatively high and the amount of tooth separation is relatively small to provide the small flow area required. Any increase in load will automatically decrease the angle of separation between the two surfaces, with a resulting decrease in flow area. This will increase the oil pressure in space 56 just sufficiently to balance the increased load. Similarly a decrease in load will cause additional separation between the two surfaces. This will increase the flow area in the metering valve just enough to drop the pressure in space 56 to that required by the changed load. Thus, the operation of the meter is stable. By pre-selecting a schedule of desired pressure differences as a function of applied torque or angle of twist of torque of shaft 13, the amount of area to be provided for any given degree of tooth separation can be readily determined.

Since the angle of twist of the torque shaft is proportional to the amount of torque applied thereto, it will be apparent that the amount of torque carried by torque shaft 13 can be determined by observing the difference in pressure existing on opposite faces of the teeth on the inner and outer spiders 9 and 10, that is, the difference in pressure in the high pressure oil space and the pressure in the low pressure oil space.

Since the present device is intended for operation at relatively high rotational speeds, it is necessary to make particular provisions for insuring against erroneous pressure readings which may be caused by pumping action due to centrifugal effects at high rotational speed. It is, therefore, an important feature of this invention that the left hand end portions of the passageways 66 and 90 in the member 11 as shown in Figure 2 terminate at exactly the same radius so that any pumping action due to centrifugal effects is exactly the same at the location at which the pressure in the high pressure oil space and in the low pressure space is measured.

Another important feature of the invention is in the provision of the runners 76 and 97 which are positioned at identical diameters at the location at which the oil is discharged from the rotating member through the passageways at 78 and 98, respectively, into the stationary housing. By the provision of these two important features the effects of any pumping action due to centrifugal effects is exactly balanced out so that pressure gages or other pressure indicating instruments connected to the high pressure and low pressure taps respectively will always indicate the correct value of the pressure difference between the high and low pressure sides of the teeth on the spider 10.

Referring to Figures 1 and 2, the stationary housing 24 is attached to the walls 130 of the main casing which surrounds the pinion 3 and carries pinion bearing 41 and 40. In this way, optimum alignment is obtained between the pinion and the bearings of passageway member 11 and shaft extension 72. A seal 132 in the form of an O-ring is positioned in a groove in the housing 24 which allows axial movement of the stationary housing with reference to the shaft to allow for temperature expansion and thrust effects. To take care of the torque reaction created on the stationary housings 24, 25, 26 and 27, a plurality of studs 134 are assembled in the wall of the casing 130 which also enter suitable holes in the retainer 34 lined with a rubber grommet or the like 136. It is noted that the studs 134 are adapted to slide in the rubber grommets. Thus, provision is made against oil leakage from the oil sump to the outside, as well as against the torque reaction in the stationary housing, while at the same time allowing the pinion to change dimensionally in the axial direction due to temperature or thrust conditions, without doing damage to the stationary parts of the torquemeter.

Provision for calibration of the device is made in the following manner. The torque shaft 13 can be calibrated by applying a known torque value to one end of the shaft 13, and, at the same time, holding the other end rigid. Under the loaded condition the amount of angular deflection is observed as compared to the unloaded condition for a number of different torque values to establish a calibration curve for the shaft.

In order to calibrate angular deflection of the torque shaft in terms of pressure differential across the faces of the spider teeth, the left hand end of the torque shaft 13 is locked relative to pinion gear 3 by means of a locking member 102 replacing flange 19 as shown in the assembly view in Figures 4 and 5. A shaft 104 is assembled inside of the hollow torque shaft 13 and is rigidly secured to the right hand end portion of said torque shaft 13. This shaft 104 carries a calibration disc 106 at its left hand or free end. Thus, any twist or angular deflection of the torque shaft 13 under load will be indicated by the relative angular displacement between the calibration disc 106 and the fixed or left hand end of torque shaft 13 or locking piece 102. Fluid is then supplied to the high pressure or inlet connection 50 and a curve of pressure differential versus angular deflection is obtained to establish a calibration curve with the normally rotating parts of the torque meter stationary. Therefore, by the use of the locking piece 102, the torque shaft 13 can be loaded to any desired degree without using an external load. This is an important feature since obtaining an external load at the high powers involved, which may be as much as 30,000 or 40,000 H. P. is extremely difficult. The locked end becomes a fixed point and the pressure difference across the spider teeth integrated over the tooth area provides the loading torque which twists the shaft in the same manner as if it were carrying an external load. The optical means shown in Figure 5 can be used for observing angular deflection from the calibration disk 106 and comprises a pivotally mounted mirror block 108 carried by locking piece 102 with an arm 110 adapted to be adjusted by adjustment screws 112. A light beam is shown at 114 which is reflected onto a scale or the like 116 adapted to receive the reflections thereof from the mirror. The reflections shown are the maximum torque deflection 118 and the zero torque deflection 120. Further description of the recording means appears to be unnecessary since the operation of the optical means is self explanatory.

It is to be noted that although usually calibration is effected with the normally rotating parts in a stationary condition, the calibration will be accurate in view of the fact that the special features referred to above cancel out any pumping effects due to centrifugal action. It is also to be noted that calibration can be performed with the parts rotating at any desired speed since above a speed of approximately 1000 R. P. M., the illumination of scale 116 by the reflected beam 114 will be sufficiently steady to obtain a scale reading (since 16 flashes per second or 16×60=960 per minute normally insures persistency of the image in the eye).

It is important to note, that with the combination of the structural features of this invention regarding the torque meter itself, plus the calibrating structure provided so that the torque meter can be calibrated with pinion 3, spider 9 and 10 and torque shaft 13 rotating at normal speeds, all operating conditions with respect to twist of the torque shaft, leakage flow, pressures and speed of rotation, etc., are duplicated. Since the torque is balanced by the integrated pressure difference across the teeth of the driven spider and the cross-sectional area of the teeth, and the flow area is fixed by the degree of tooth separation and the contour of the milled slot in the metering valve all conditions of oil flow in the various passages are duplicated by supplying the same rate of oil flow during both calibration and actual operation for any desired load, torque or speed. Therefore, by calibrating at a series of pre-selected points it is possible to completely reproduce all possible operating conditions during calibration of the device.

In summary therefore, under normal running conditions, the device operates as follows; the pinion 3 drives the shaft 13 through the spiders 9 and 10. Oil under pressure is supplied to the area between the spiders at a constant rate of flow. Therefore, torque loads on the shaft 13 or deflections of the shaft 13 change the area beween the spiders. Since the rate of flow of the oil is constant, the pressure changes are an indication of the deflection or torque of the shaft 13. The readings of the pressure changes are an indication of the torque. An important feature is the metering valve 58 which assures constant flow between the spider teeth.

In order to calibrate the torque meter, the locking member 102 secures the shaft 13 to the drive pinion 3. The shaft 104 is fixed to the shaft 13. Therefore, if the rate of flow is changed the pressure is changed correspondingly so as to supply a torque to the shaft 104. The shaft 104 deflects with respect to shaft 13. Therefore, means are provided for recording this deflection. For each change in the rate of flow there is a corresponding deflection of shaft 104. Therefore, a calibration curve can readily be obtained. This is accomplished by the torque meter being run at full speed so as to account for the pressure fluctuations and centrifugal forces. Therefore, a very accurate calibration curve can be obtained.

Therefore, applicant has provided a torque meter that is capable of determining torque by measuring an oil pressure differential across the teeth of the driving spider. Also, the governing or metering element in combination with the torque measuring means improves the stability of the operation of the device and increases the degree of accuracy thereof. Applicant has also provided a means for cancelling the effects of pumping action due to centrifugal forces arising from rotation; that is, both pressure sensing runners 76 and 97 terminate at the same radius.

It is apparent that the above description was given by way of example and not by way of limitation, and that many modifications, improvements and changes may be made within the spirit and intent of this invention, all of these improvements, modifications and changes are to be considered as equivalents and be included within the scope of this invention.

What I claim as new and desire to secure by Letters Patent of the United States is:

1. In a torque meter having a driving element and a driven element coupled in torque transmitting relationship through an intermediate fluid medium, said driven element comprising a first portion engaging said fluid medium, a second portion engageable with a load, and an intermediate torsion member, means for calibrating said torque meter while rotating at a preselected speed comprising lock means for securing said second portion of said driven member to said driving member, and differential movement indicating means connected between said first portion of said driven member and said driving member to indicate the magnitude of differential deflection therebetween upon changes in pressure of said fluid medium.

2. In a torque meter comprising a driving element, a driven element coupled to said driving element through a fluid medium, said driven element including a first portion forming fluid pressure chambers with said driving element and engaging said fluid medium, a second portion connectible to a load, and an elongated shaft interconnecting said first and second portions, means for calibrating said torque meter comprising a locking member engageable with said driving member and with said second portion of said driven member to secure the driving member to said second portion of said driven member, and means responsive to differential movement between said driving member and said first portion of said driven member to provide a signal proportional to the torsional deflection of said elongated shaft upon changes in pressure of said fluid medium.

References Cited in the file of this patent
UNITED STATES PATENTS

| | | |
|---|---|---|
| 904,432 | Hopkinson et al. | Nov. 17, 1908 |
| 2,302,496 | Gasser | Nov. 17, 1942 |
| 2,322,182 | Walker | June 15, 1943 |
| 2,398,167 | Walker | Apr. 9, 1946 |
| 2,715,834 | Chamberlin | Aug. 23, 1955 |